(12) United States Patent
Butler

(10) Patent No.: US 6,478,340 B1
(45) Date of Patent: Nov. 12, 2002

(54) Y-PIPE FOR THIN BOOM TUBE EXHAUST PIPES PROVIDING INCREASED GROUND CLEARANCE ON RACE CARS

(76) Inventor: Boyd L. Butler, 1672 E. 10770 South, Sandy, UT (US) 84092

( * ) Notice: Subject to any disclaimer, the term of this patent is extended or adjusted under 35 U.S.C. 154(b) by 0 days.

(21) Appl. No.: 09/539,154

(22) Filed: Mar. 30, 2000

(51) Int. Cl.[7] ................................................. F16L 39/00
(52) U.S. Cl. ........................ 285/131.1; 138/39; 60/323
(58) Field of Search .......................... 285/131.1, 132.1, 285/125.1, FOR 137; 138/37, 39, 109, 177, 178, DIG. 11; 180/309; 29/890.08; 181/251, 264, 267, 268; 60/323

(56) References Cited

U.S. PATENT DOCUMENTS

| | | | | |
|---|---|---|---|---|
| 2,275,572 A | * | 3/1942 | Somers ..................... 285/125.1 |
| 2,370,555 A | * | 2/1945 | Mabrito ................... 285/131.1 |
| 2,847,819 A | * | 8/1958 | Muller ................. 285/125.1 X |
| 3,434,199 A | * | 3/1969 | Arthur et al. ........ 285/131.1 X |
| 5,148,597 A | * | 9/1992 | Weeks ..................... 29/890.08 |
| 5,879,029 A | * | 3/1999 | Wilks .................. 285/131.1 X |
| 5,937,908 A | * | 8/1999 | Inoshiri et al. ............... 138/39 |
| 6,027,146 A | * | 2/2000 | Kurimoto ................ 285/131.1 |
| 6,283,162 B1 | * | 9/2001 | Butler .................... 180/309 X |

* cited by examiner

*Primary Examiner*—Greg Binda
(74) *Attorney, Agent, or Firm*—Mallinckrodt & Mallinckrodt

(57) ABSTRACT

A Y-pipe and flattened boom tube exhaust pipe for use on race cars, such as stock cars which race on oval tracks, which mount to the lower frame or chassis of the car, and which route exhaust gasses to the side of the car while providing improved ground clearance. The Y-pipe comprises first and second longitudinally flattened or tapered secondary exhaust pipes having respective generally circular cross-section inlet portions connectable to a header assembly and respective laterally bevelled, flattened circular cross-section outlet portions which are affixed together so as to merge together to a single outlet opening which is connectable to the inlet of the boom tube exhaust pipe. The boom tube exhaust pipe comprises a tubular inlet and attached tubular body.

38 Claims, 6 Drawing Sheets

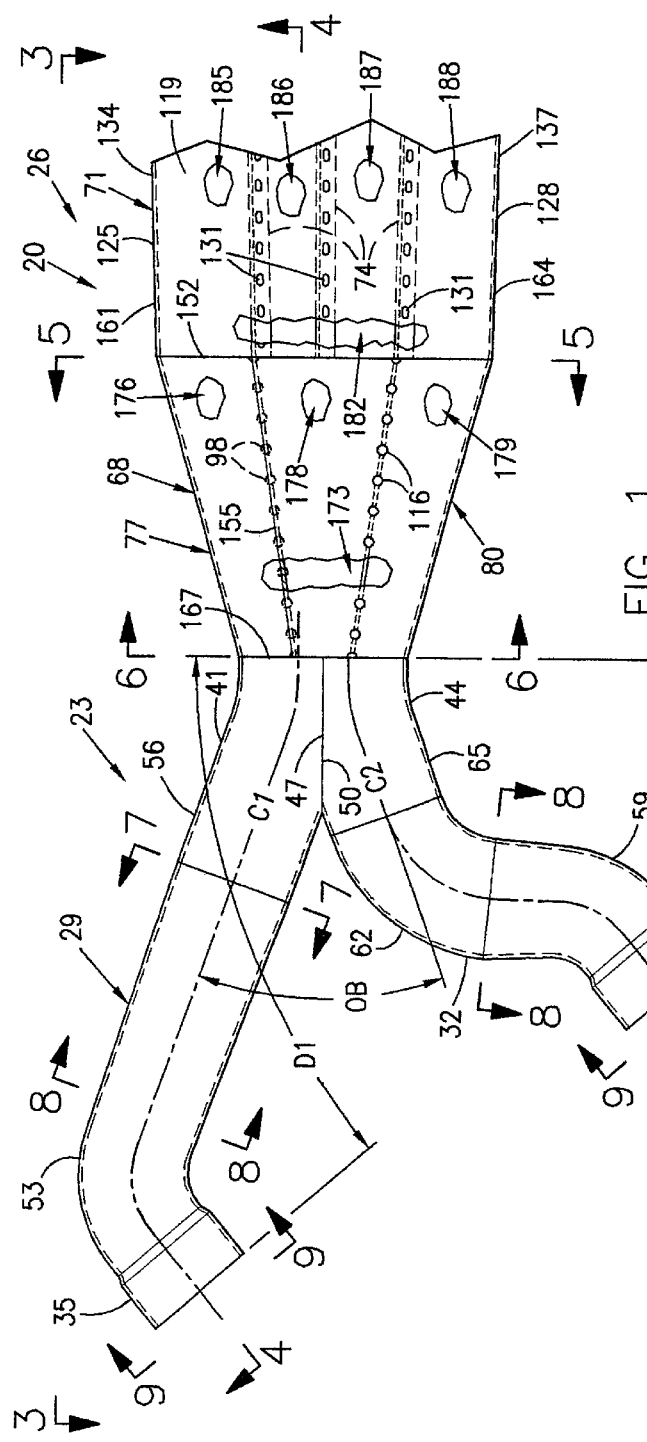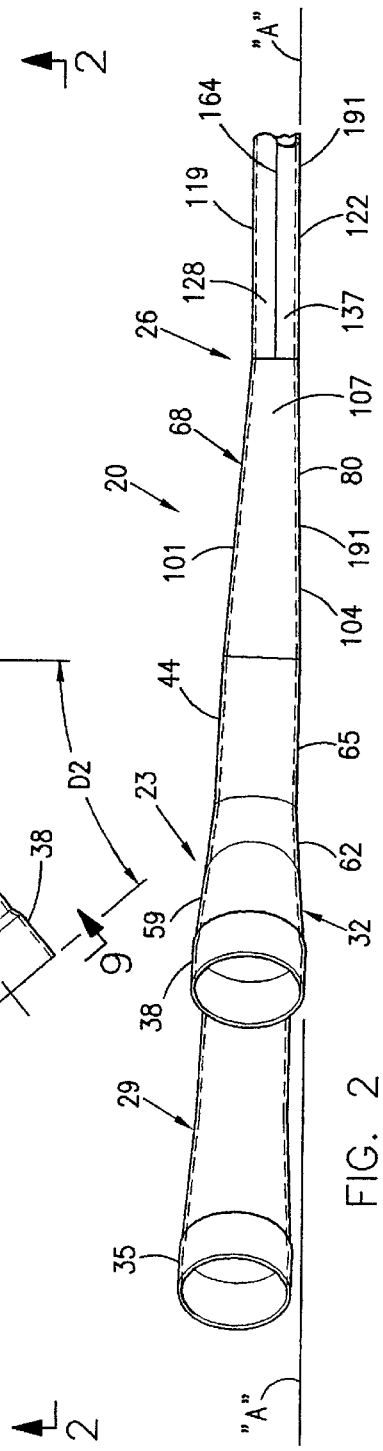

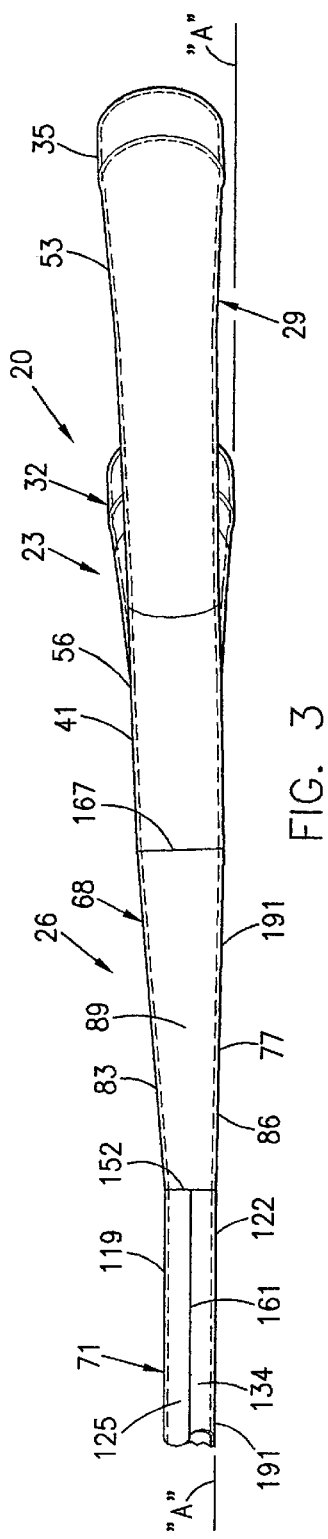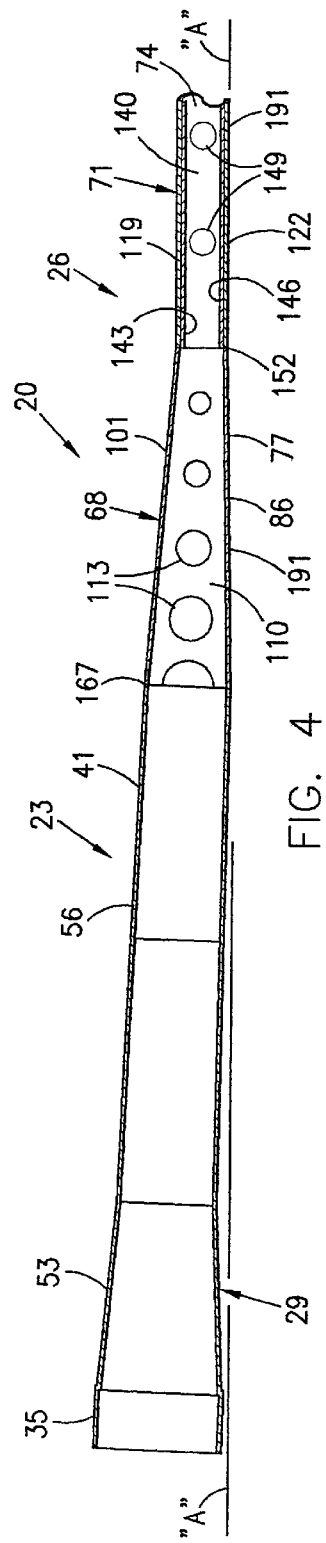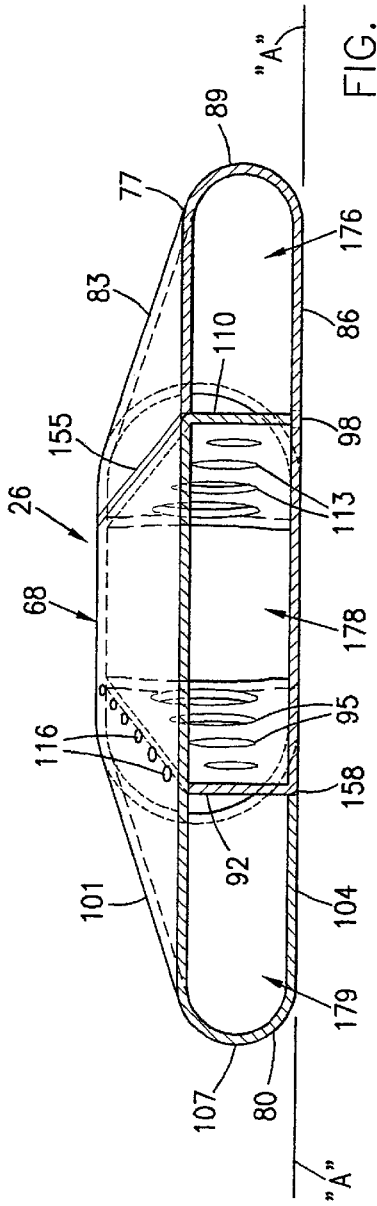

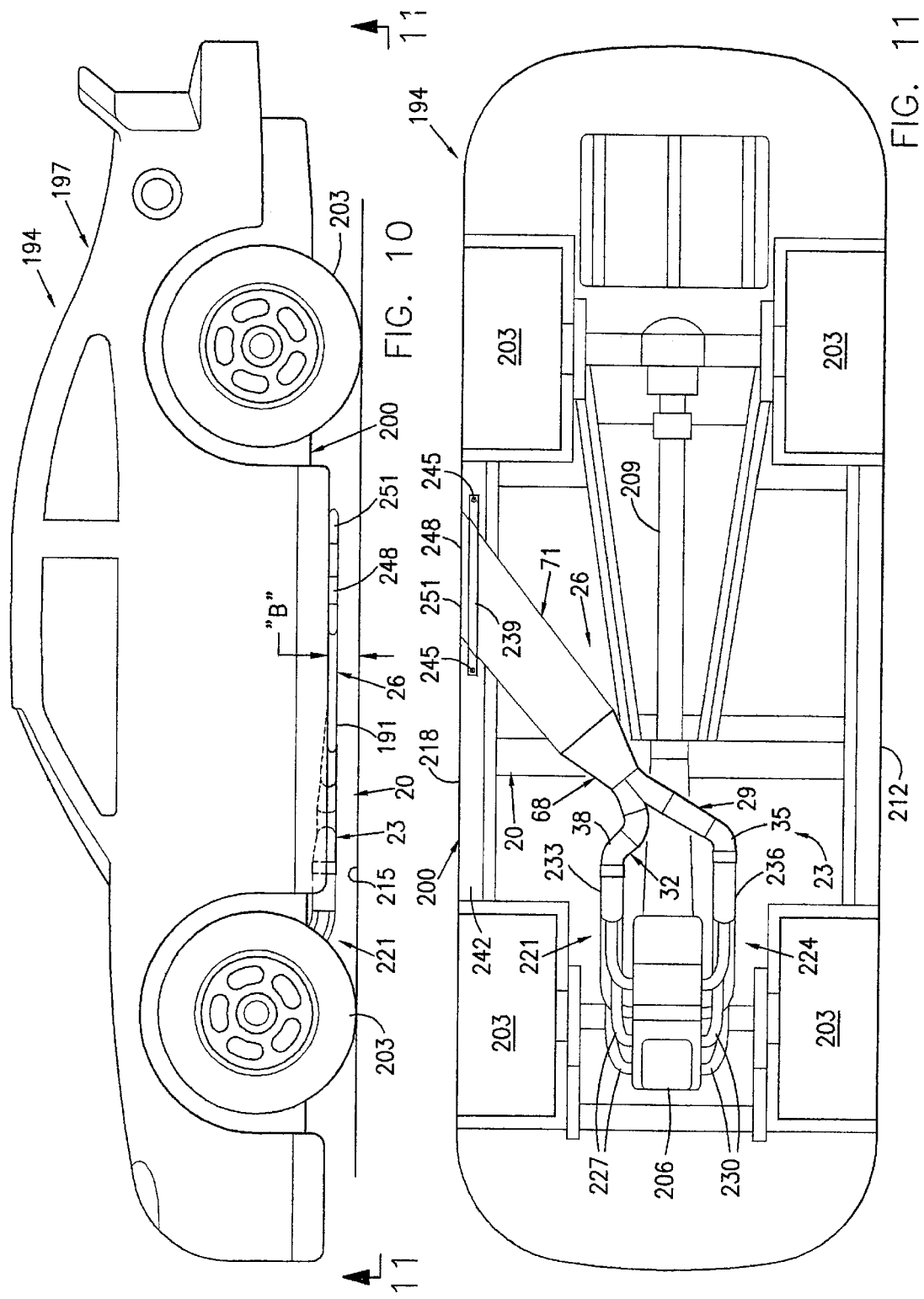

Figure 6:
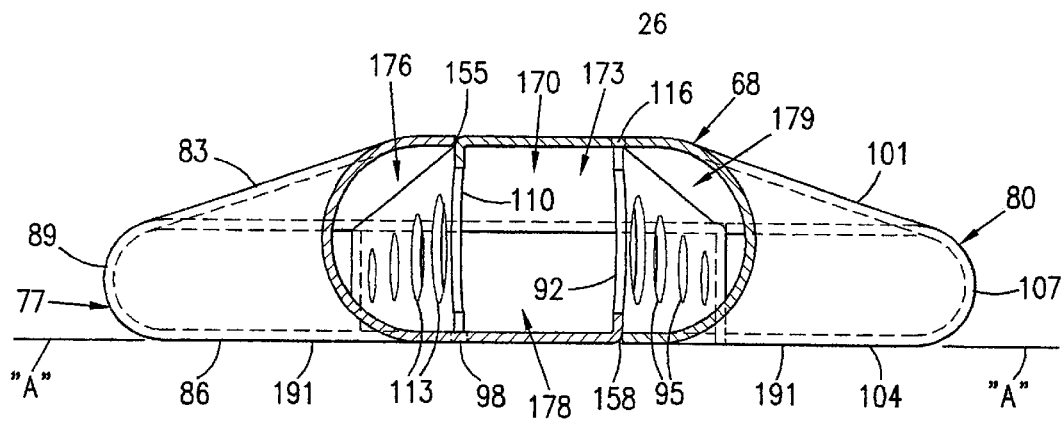

Y-PIPE FOR THIN BOOM TUBE EXHAUST PIPES PROVIDING INCREASED GROUND CLEARANCE ON RACE CARS

BACKGROUND OF THE INVENTION

1. Field

The invention is in the field of exhaust systems for automobiles, and more specifically thin exhaust pipes for increased ground clearance on racing cars used on oval tracks such as stock cars.

2. State of the Art

Race cars used in automobile racing are typically constructed such that only a minimal amount of clearance is maintained between the underside of the car and the surface of the roadway or track. This is done to lower the center of gravity of the vehicle so as to improve vehicle handling and resistance to rolling over, and to minimize the drag on the car due to air passing thereunder. Likewise, such race cars typically have very stiff suspension systems which do not allow the vehicle to travel as great a distance up and down nor side-to-side as a standard production car allowing the use of less ground clearance. One of the problems encountered in lowering the race car closer to the race track is providing sufficient clearance for the vehicle exhaust system which is one of the lowest hanging components of a typical car, including race cars.

The problem is particularly acute on cars which race on oval race tracks such as stock cars. The exhaust pipes of such stock cars typically exit toward one or both sides of the car so as to minimize the length of the exhaust pipes to the resulting exhaust gas back pressure which back pressure lowers engine power output and overall engine performance, and to keep the hot exhaust pipes away from the fuel cell so as to minimize the chance of a fuel fire. As such, the minimum ground clearance of the exhaust system typically occurs where the exhaust pipes cross under the longitudinally-extending main frame members of the chassis at the sides of the vehicle. Stock cars typically race on oval tracks in a counter-clockwise rotational direction with centrifugal force causing the body and chassis of the car to lean toward the outside of the turn or toward the right side of the car. Therefore, the ground clearance on the right side of the car is less during cornering and the greatest ground clearance results on the left side of the car during such cornering. Also, banked tracks can induce high downward loads to the suspension system of stock cars requiring additional ground clearance. In an effort to increase the ground clearance of the exhaust system on stock cars, thin profile boom tube exhaust pipes were developed which extend at a rearward, laterally outwardly-directed angle from the secondary exhaust pipes under the main frame members of the chassis. The outlet end of such :boom tube exhaust pipe is typically manufactured in a squared-off or right angle end configuration and trimmed at installation to match exit angle and the side of the particular vehicle.

The construction of prior art boom tube exhaust pipes typically takes several forms. A first type of prior art boom tube includes a thin profile, generally flattened sheet metal body having a pair of spaced, parallel flat upper and lower sheet metal pieces and a pair of elongate, U-shaped cross-section sheet metal side pieces welded to respective side edges of the upper and lower sheet metal pieces so as to form a generally flattened tubular body. The upper and lower sheet metal pieces can be tapered so as to form a laterally tapered body which allows the exhaust gasses to expand while travelling therethrough. The upper and lower sheet metal pieces are typically interconnected by a plurality of short rods welded into staggered mating holes in such upper and lower sheet metal pieces. The rods are an attempt to minimize vibration of the broad upper and lower half shells which vibration can cause increased exhaust gas back pressure, resonance and increased noise, and metal fatigue. The boom tube exhaust pipe further includes a single funnel shaped inlet or a pair thereof which is welded to one end of the generally flattened tubular body to connect with the secondary exhaust pipe or pipes of the vehicle. Such inlets typically comprise a longitudinally split thin walled metal tube, the respective halves of which are partially flattened, more so at one end than the other end, and each longitudinally welded at the edges thereof to a pair of upper and lower tapered flat plates, the narrower edge thereof being adjacent the less-flattened ends of the respective half tubes so as to form a generally funnel shaped inlet with a somewhat flattened circular inlet end and a generally flattened profile outlet end. Alternatively, such inlets can comprise a thin walled metal tube into the respective ends of which are forced appropriately shaped arbors or forms which stretch and form the tube into a somewhat flattened circular shaped inlet end and a generally flattened profile outlet end. Such boom tube exhaust pipe is expensive to manufacture due to the multitude of rods and welding involved and is still prone to metal fatigue due to the increased stresses in the half shells at the respective holes therethrough, and due to the increased brittleness of the metal of the half shells and rods due to the heat applied during welding thereof.

A second type of prior art boom tube exhaust pipe comprises a large diameter, thin walled steel tube which is generally flattened so as to form a thin profile, generally flattened tubular body. The upper and lower portions of the tubular body can be inter-connected by a plurality of rods as explained for the first version prior art boom tube exhaust pipe. A single funnel shaped inlet or a pair thereof of similar construction as that of the first version prior art boom tube is welded to one end of the flattened tubular body to connect with the secondary exhaust pipe or pipes of the vehicle. The tubular body of such boom tube exhaust pipe does not taper outwardly from the inlet end to the outlet end due to fabrication from a tube such that exhaust gasses cannot expand while moving therethrough, causing increased exhaust gas back pressure and suffers from the same disadvantages as the first version prior art boom tube exhaust pipe.

A third type of prior art boom tube takes the form of a rectangular extruded steel tube to which a pair of elongate U-shaped cross-section sheet metal side pieces are welded to the sides thereof to form a thin profile, generally flattened tubular body having three elongate passageways therein. A plurality of exhaust crossover holes are typically drilled or milled through the walls of the tube to allow crossover flow of exhaust gasses between the elongate passageways. A single funnel shaped inlet or a pair thereof of similar construction as that of the first version prior art boom tube is welded to one end of the flattened tubular body to connect the secondary exhaust pipe or pipes of the vehicle to direct the exhaust gasses into the ends of the respective tubes. A plurality of such rectangular tubes (or square tubes) can be welded together side-by-side in place of the single rectangular tube with the sheet metal side pieces welded to the two outermost tubes to form a thin profile, generally flattened tubular body of greater width than using a single rectangular tube. A plurality of exhaust crossover holes are typically drilled or milled through the walls of the tubes to allow crossover flow of exhaust gasses between the elongate passageways. A single funnel shaped inlet or a pair thereof is welded to one end of the flattened tubular body to connect the secondary exhaust pipe or pipes of the vehicle to direct the exhaust gasses into the ends of the respective tubes. While such boom tube exhaust pipe is more fatigue resistant than the sheet metal, the weight thereof is greater, the exhaust gas crossover tubes must typically be drilled or milled rather than less expensive punching thereof, and the body is not tapered such that exhaust gasses cannot expand while traveling therethrough, resulting in increased exhaust gas back pressure.

Such prior art boom tube exhaust pipes can be constructed such that the inlet is at or above a lower plane of the body thereof so as to maximize ground clearance. Likewise, exhaust systems comprising a pair of headers each including a plurality of primary exhaust pipes which connect at one end thereof to the cylinder block of an internal combustion engine at respective exhaust outlet ports thereof and at opposite ends thereof which converge into a single merge collector, a pair of secondary exhaust pipes which connect to the outlet of the respective merge collectors, and one or two boom tube exhaust pipes are used in auto racing. Such exhaust systems can be made and mounted to a race car such that the entire exhaust system, including the inlets of the boom tube exhaust pipes, are at or above the lower plane of the bodies of the boom tube exhaust pipes to maximize ground clearance of the exhaust system.

In my co-pending U.S. patent application Ser. No. 09/392,398 titled "Thin Boom Tube Exhaust Pipes . . ." filed Sep. 9, 1999, now U.S. Pat. No. 6,283,162, which is hereby incorporated herein by reference, I disclose a flattened single or dual inlet boom tube exhaust pipe for use on race cars, such as stock cars which race on oval tracks, which mounts to the standard exhaust system pipes and to the lower frame or chassis of the car, and which routes exhaust gasses to one or both sides of the car while providing improved ground clearance between the exhaust pipe and the surface of the race track. The construction of the boom tube exhaust pipes comprise single or dual slightly flattened circular inlets which lead exhaust gasses into a flattened profile body constructed of formed sheet metal half shells, with the inlets at or above the lower plane of the body. One or more formed sheet metal structural ribs extend through the body and into the inlets and one or more spacer ribs support the half shells within the body. The boom tube exhaust pipes can be made with internal baffles or spiral acoustic traps so as to also be an acoustic muffler.

SUMMARY OF THE INVENTION

The invention comprises a Y-pipe assembly for attachment to the respective ends of a pair of primary exhaust pipes or header assemblies which lead exhaust gasses from the engine of a motor vehicle, and to the inlet of a boom tube exhaust pipe which mounts to the bottom portion of the frame or chassis of the motor vehicle, which Y-pipe assembly and boom tube exhaust pipe provide improved ground clearance. The Y-pipe comprises a first secondary exhaust pipe comprising an inlet portion connectable to one of the header assemblies for receiving exhaust gasses therefrom and a bevelled outlet portion, and a second secondary exhaust pipe comprising an inlet portion connectable to the other of the header assemblies for receiving exhaust gasses therefrom and a bevelled outlet portion. The bevelled outlet portions of the secondary exhaust pipes are affixed together along a respective edge of each thereof so as to merge together with respective centerlines thereof at an oblique angle to a single outlet opening which is connectable to the inlet of the boom tube such as by affixing thereto. Both secondary exhaust pipes are preferably substantially the same length as measured along respective longitudinal centerlines thereof such as by curving one secondary exhaust pipe to lengthen to that of the other secondary exhaust pipe and wherein the included convergence angle of intersection of the centerlines is between about zero and sixty degrees, preferably being as shallow an angle as reasonably possible to fit the particular motor vehicle. This equalization of lengths and relatively shallow convergence angle provides a more evenly timed and balanced flow of exhaust gasses therethrough as pressure pulses of exhaust gasses from respective exhausting engine cylinders alternately flow therethrough with minimal induced turbulence for reduced exhaust back pressure and maximum engine performance. The respective secondary exhaust pipes are typically longitudinally tapered in the vertical direction with the first end portion of the respective secondary exhaust pipes being substantially round in cross-section and radially flared so as to closely fit to the respective header assembly so as to be thinner at the second end portion than the first end portion thereof for improved ground clearance.

The invention further comprises a tubular inlet for a boom tube exhaust pipe of the type which further includes a tubular body of generally flattened shape having a first end with an inlet opening for receiving exhaust gasses and a second end which terminates at an outlet opening for expelling the exhaust gasses into the atmosphere, the boom tube exhaust pipe being for attachment to the outlet end of the Y-pipe or other secondary exhaust pipes attached to an exhaust header assembly which leads exhaust gasses from the engine of a motor vehicle. The tubular inlet is preferably made of sheet metal and includes a first end preferably of a somewhat flattened circular shape for attachment to a comparably configured Y-pipe or other secondary exhaust pipe or pipes and having an inlet opening for receiving exhaust gasses therefrom, the tubular inlet tapering from the first end to a generally flattened second end of mating configuration for attachment to the tubular body for channeling the exhaust gasses from the Y-pipe to the body of the boom tube exhaust pipe. The inlet preferably has a flattened lower surface and includes a pair of sheet metal structural ribs of generally trapezoidal shape as viewed from a respective side thereof disposed in a spaced apart relationship which extend generally longitudinally through the tubular inlet diverging from the first to the second end thereof and which vertically span between and are affixed to the tubular inlet juxtaposed an upper and a lower inside surface of the tubular inlet so as to provide support therebetween. The ribs typically include a plurality of exhaust gas cross-over holes which extend therethrough extend therethrough to allow exhaust gasses to flow therethrough.

The tubular inlet works in conjunction with the Y-pipe to draw exhaust gasses from the engine cylinders by means of the pressure pulses therefrom which flow in a generally alternating timing from the respective engine cylinders, through the headers, through the secondary exhaust pipes of the Y-pipe and into the tubular inlet and the body of the boom tube exhaust pipe. Though not quite as efficient as pure alternate firing cylinder engines such as six cylinder flat opposed engines, the Y-pipe and tubular inlet works to improve the performance of eight cylinder V-block engines, which engines have some consecutive pulses through the same header assemblies. The flow of the alternating pressure pulses are accelerated as they merge in the Y-pipe and pass into the tubular inlet wherein the flow is allowed to expand, and further expand in the body of the boom tube exhaust pipe. As a pressure pulse of exhaust gasses flows through one of the secondary exhaust pipes of the Y-pipe and into the tubular inlet, the inertia of the accelerating flow of exhaust gasses passing the opening thereinto of the other secondary exhaust pipe, a partial vacuum or lower pressure is briefly created within such other secondary exhaust pipe. When the next cylinder exhausts into such other secondary exhaust pipe forming a pressure pulse of exhaust gasses, the flow thereof is accelerated due to the lower pressure therein created by the previous pressure pulse such that more exhaust is removed from the exhausting engine cylinder. This increased removal of exhaust gasses from the cylinders of the engine improves engine performance by allowing space for more fresh fuel/air mixture to enter the cylinder for the next firing of the cylinder. The ribs within the tubular inlet (and within body of the boom tube exhaust pipe) direct the flow and control the expansion of exhaust gasses, with the exhaust gas cross-over holes allowing controlled mixing of the exhaust gasses therebetween for fine tuning of the exhaust flows.

A second version of the tubular inlet comprises a pair of respective inner shells of generally L-shaped cross-section and a pair of respective outer shells of generally U-shaped cross-section, the inner shells each being a single piece of formed sheet metal having a generally flat wall portion of generally trapezoidal shape with one of the ribs dependent therefrom also being of generally trapezoidal shape, the outer shells each being a single piece of formed sheet metal having a pair of spaced apart, generally flat walls of generally trapezoidal shape interconnected by respective curved side wall configuration for attachment such as by being affixed to the tubular body. The beveled outlet portions of the secondary exhaust pipes are affixed together at an oblique angle along a respective edge of each thereof so as to merge together at an oblique angle to a single outlet opening which is of mating configuration so as to be connectable to the first end of the inlet such as by affixing thereto for channeling the exhaust gasses from the secondary exhaust pipe to the body of the boom tube exhaust pipe.

A first version of the tubular inlet comprises a pair of respective upper and lower half shells, each being a single piece of formed sheet metal having a pair of respective generally flat upper and lower wall portions interconnected by a curved side wall portion and a tapered rib portion dependent from one of the wall portions, the half shells which are welded together at a pair of generally longitudinally-extending seams and plug welded at a plurality of generally longitudinally-extending plug weld holes through the wall portion adjacent each of the ribs.

The invention further comprises a Y-pipe and tubular inlet assembly comprising a Y-pipe and a tubular inlet, both being of any of the types described above and affixed together, the Y-pipe being of suitable configuration for attachment to the respective ends of a pair of primary exhaust pipes or header assemblies which lead exhaust gasses from the engine of a motor vehicle, the tubular inlet being for attachment to the tubular body of generally flattened shape of a boom tube exhaust pipe having a first end of suitable configuration with an inlet opening for receiving exhaust gasses and a second end which terminates at an outlet opening for expelling the exhaust gasses into the atmosphere.

The invention further comprises a boom tube exhaust pipe comprising an inlet and a tubular body, the tubular inlet being of any of the types described above and a tubular body being of generally flattened shape of any suitable construction and affixed together, the tubular inlet being of suitable configuration for attachment to the end of a Y-pipe or other secondary exhaust pipes leading exhaust gasses from the engine of a motor vehicle, which boom tube exhaust pipe mounts to the bottom portion of the frame or chassis of the motor vehicle, and which provides improved ground clearance between the exhaust pipe and the surface of the ground. The tubular body typically includes one or more structural ribs which extend generally longitudinally through the tubular body and which vertically spans between and is affixed to the tubular body juxtaposed an upper and a lower inside surface of the tubular body so as to provide support therebetween.

The invention further comprises a Y-pipe and boom tube assembly comprising a Y-pipe and a tubular inlet, and a tubular body, all being of any of the types described above and affixed together, the Y-pipe being of suitable configuration for attachment to the respective ends of a pair of primary exhaust pipes or header assemblies which lead exhaust gasses from the engine of a motor vehicle, and which boom tube exhaust pipe of the Y-pipe and boom tube exhaust pipe assembly mounts to the bottom portion of the frame or chassis of the motor vehicle, and which provides improved ground clearance between the exhaust pipe and the surface of the ground.

The invention further comprises exhaust systems which include the Y-pipe and boom tube exhaust pipe assemblies of the invention, for use on motor vehicles powered by an internal combustion engine having multiple power cylinders at opposite sides thereof, for attachment to the engine of a motor vehicle, which exhaust systems provide improved ground clearance between the exhaust pipe and the surface of the ground. The exhaust systems comprise a Y-pipe and boom tube exhaust pipe of any of the types described above, and a pair of exhaust pipe header assemblies each including a plurality of primary exhaust pipes each connectable at a first end thereof to a respective power cylinder at a respective side of the engine and a merge collector into which respective opposite ends of the primary exhaust pipes are affixed.

THE DRAWINGS

Figure 7:
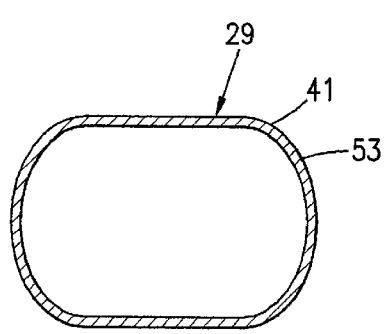
Figure 8:
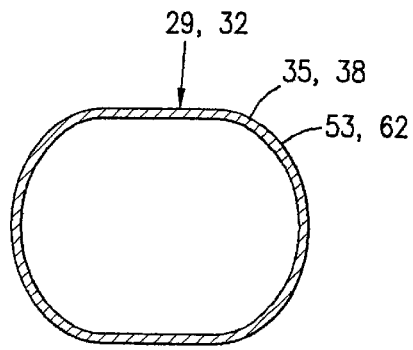
Figure 9:
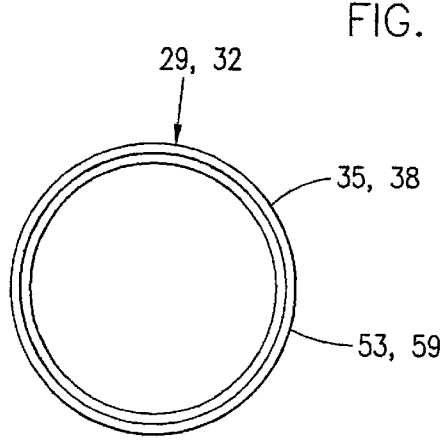
Figure 12:
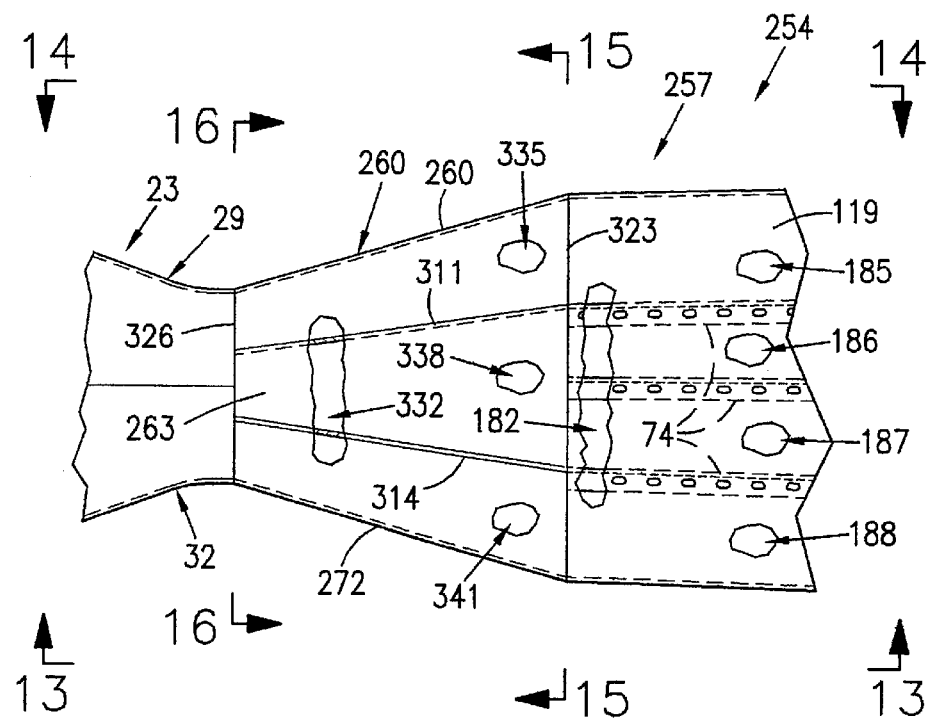
Figure 13:
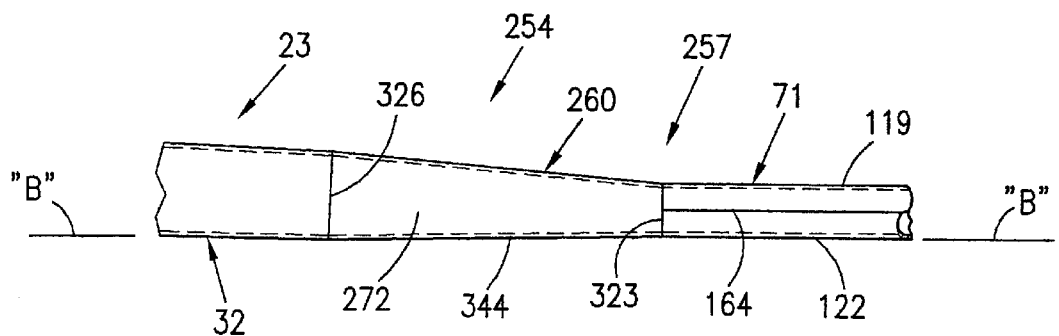
Figure 14:
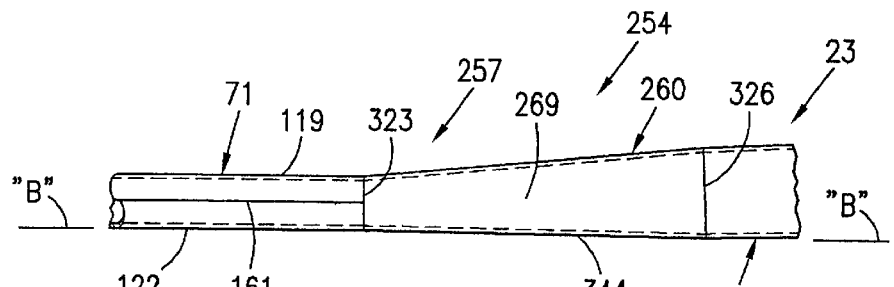
Figure 15:
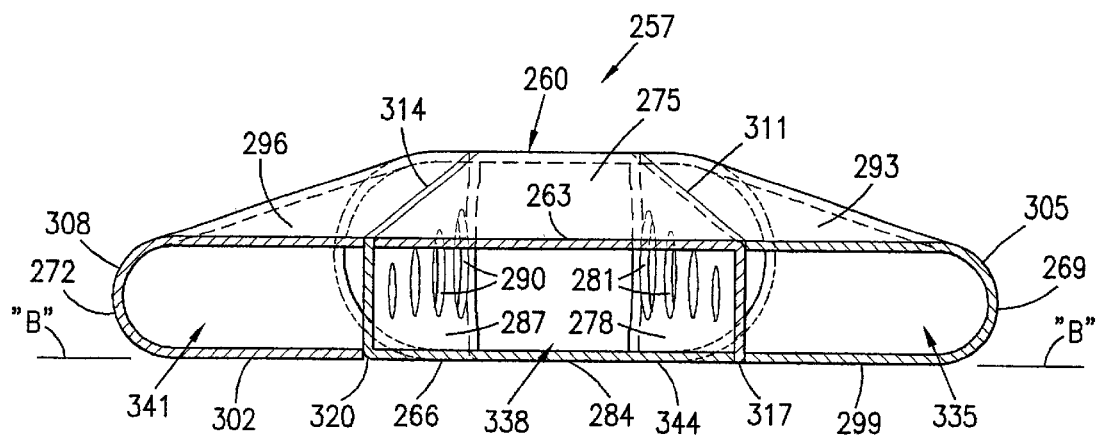
Figure 16:
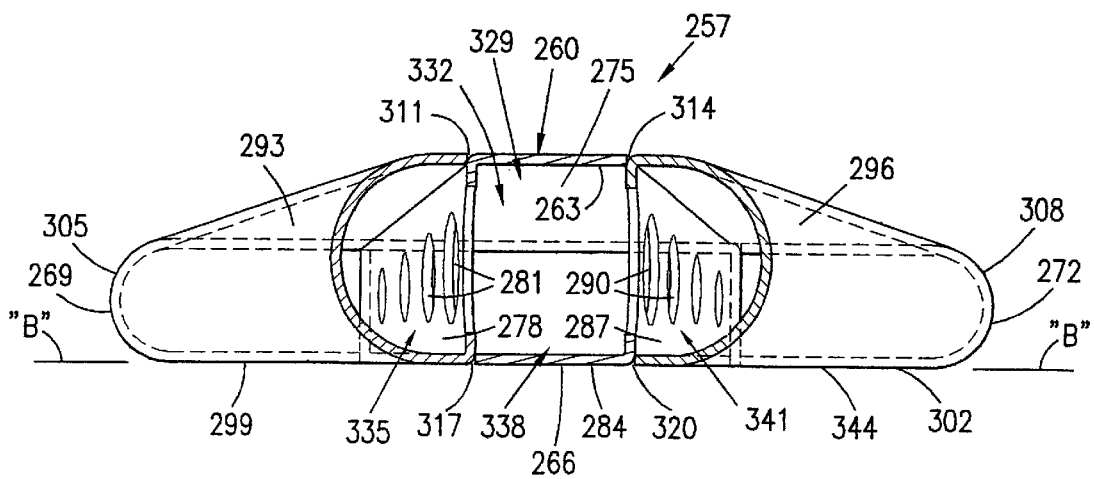

The best mode presently contemplated for carrying out the invention is illustrated in the accompanying drawings, in which:

FIG. 1 is a fragmentary top plan view of a first embodiment Y-pipe boom tube exhaust pipe assembly of the invention showing the Y-pipe, and a first version tubular inlet and the body of the boom tube;

FIG. 2, a fragmentary side elevational view taken on the line 2—2 of FIG. 1 showing the tapered configuration, wherein the secondary exhaust pipes take on a flattened or oval cross-section, of such first embodiment Y-pipe boom tube exhaust pipe assembly;

FIG. 3, a fragmentary side elevational view taken on the line 3—3 of FIG. 1 showing the tapered configuration, wherein the secondary exhaust pipes take on a flattened or oval cross-section, of such first embodiment Y-pipe boom tube exhaust pipe assembly from the opposite side;

FIG. 4, a longitudinal vertical sectional view taken on the line 4—4 of FIG. 1 showing the internal construction of such first embodiment Y-pipe boom tube exhaust pipe assembly;

FIG. 5, a lateral vertical sectional view taken on the line 5—5 of FIG. 1 showing the construction of such first version tubular inlet;

FIG. 6, a lateral vertical sectional view taken on the line 6—6 of FIG. 1 showing the construction of such tubular inlet;

FIG. 7, a lateral vertical sectional view taken on the line 7—7 of FIG. 1 showing the somewhat flattened circular cross-section of a secondary exhaust pipe of the Y-pipe;

FIG. 8, a lateral vertical sectional view taken on the lines 8—8 of FIG. 1 showing the somewhat flattened circular cross-section of the secondary exhaust pipes of the Y-pipe;

FIG. 9, an end view of the secondary exhaust pipes taken on the lines 9—9 of FIG. 1 showing the circular cross-section flared construction thereof;

FIG. 10, a side elevational view of a race car having an eight cylinder engine with such first embodiment Y-pipe boom tube exhaust pipe assembly mounted thereto;

FIG. 11, a bottom plan view taken on the line 11—11 of FIG. 10 showing the header assemblies connected to such first embodiment Y-pipe and the mounting of the body of the boom tube exhaust pipe to the chassis of the car;

FIG. 12, a fragmentary top plan view of a second embodiment Y-pipe boom tube exhaust pipe assembly of the invention showing the Y-pipe, and a second version tubular inlet and the body of the boom tube;

FIG. 13, a fragmentary side elevational view taken on the line 13—13 of FIG. 12 showing the tapered configuration of such second embodiment Y-pipe boom tube exhaust pipe assembly;

FIG. 14, a fragmentary side elevational view taken on the line 14—14 of FIG. 12 showing the tapered configuration of such second embodiment Y-pipe boom tube exhaust pipe assembly from the opposite side;

FIG. 15, a lateral vertical sectional view taken on the line 15—15 of FIG. 12 showing the construction of the second version tubular inlet; and;

FIG. 16, a lateral vertical sectional view taken on the line 16—16 of FIG. 12 showing the construction of such second version tubular inlet.

DETAILED DESCRIPTION OF THE ILLUSTRATED EMBODIMENTS

Referring to FIGS. 1–9, therein is shown a first embodiment Y-pipe boom tube exhaust pipe assembly of the invention, Y-pipe boom tube exhaust pipe assembly 20, comprising a Y-pipe assembly 23 and a flat exhaust pipe 26. Y-pipe assembly 23 comprises a pair of curved secondary exhaust pipes 29 and 32 having respective flared inlet portions 35 and 38, and partially flattened or oval, longitudinally beveled outlet portions 41 and 44 which are welded together at respective edges 47 and 50 at an oblique angle "OB" preferably of between about 0 degrees to 60 degrees. Inlet portions 35 and 38 can be staggered as shown, or aligned side-by-side so as to fit the exhaust system of the particular motor vehicle. Secondary exhaust pipes 29 and 32 are preferably of substantially equal lengths "D1" and "D2" as measured along respective centerlines "C1" and "C2", with secondary exhaust pipe 32 being curved further than necessary to equalize lengths "D1" and "D2". Secondary exhaust pipe 29 is preferably manufactured as two individual pieces of pipe 53 and pipe 56 which are welded together following bending and flaring thereof for ease of manufacture. Likewise, secondary exhaust pipe 32 is preferably manufactured as three individual pipes 59, 62, and 65 which are welded together following bending and flaring thereof for ease of manufacture. Secondary exhaust pipes 29 and 32 are shaped so as to be thinner at one end or longitudinally tapered, being of generally round cross-section at respective flared inlet portions 35 and 38 tapering to generally flattened round cross-section at respective beveled outlet portions 41 and 44 thereof, allowing for increased ground clearance (FIG. 10). Secondary exhaust pipes 29 and 32 are typically made of mild steel or stainless steel tubing which is flared at respective inlet portions 35 and 38, then a portion of each of which is partially flattened on a longitudinal taper.

Flat exhaust pipe 26 comprises a first version exhaust gas inlet 68, a body 71, and a plurality of spacer ribs 74. Inlet 68 comprises upper and lower front half shells 77 and 80, upper front half shell 77 being a single piece of formed sheet metal comprising a generally flat upper wall portion 83 and lower wall portion 86 interconnected by a curved side wall portion 89, and a tapered trapezoidal structural rib or rib portion 92 downwardly dependent from upper wall portion 83 and having a plurality of variously sized exhaust cross-over holes 95 therethrough. A plurality of plug weld holes 116 extend generally longitudinally along upper wall portion 83. Lower front half shell 80 is likewise a single piece of formed sheet metal comprising a generally flat upper wall portion 101 and lower wall portion 104 interconnected by a curved side wall portion 107, and a tapered trapezoidal structural rib or rib portion 110 upwardly dependent from lower wall portion 104 and having a plurality of variously sized exhaust cross-over holes 113 therethrough. A plurality of plug weld holes 98 extend generally longitudinally along lower wall portion 104. Rib portions 92 and 110 diverge as shown when the upper and lower half shells 77 and 80 are assembled together.

Body 71 and spacer ribs 74 are of the general type as described in my co-pending U.S. patent application Ser. No. 09/392,398, now U.S. Pat. No. 6,283,162, body 71 comprising an upper rear half shell 119 and a lower rear half shell 122. Upper rear half shell 119 is a single piece of formed sheet metal of a tapered, flattened shape having downwardly rounded outside edge portions 125 and 128. A plurality of plug weld holes such as plug weld slots 131 extend longitudinally along upper rear half shell 119. Lower rear half shell 122 is a single piece of formed sheet metal of a tapered, flattened shape having upwardly rounded outside edge portions 134 and 137. A plurality of plug weld holes such as plug weld slots (not shown) extend longitudinally along lower rear half shell 122. Spacer rib 74 is a single piece of sheet metal having a C-shaped channel cross-section, with a web 140 inter-connecting respective upper and lower flanges 143 and 146. A plurality of round exhaust gas cross-over holes 149 extend through web 140, though the configuration thereof can be other than round, as with any of the other exhaust gas cross-over holes in any of the embodiments of the invention.

A lateral circumferential weld seam 152, a longitudinal upper weld seam 155, a longitudinal lower weld seam 158, a pair of longitudinal outside weld seams 161 and 164, and plug welds (not shown) in the respective plug weld holes including round plug weld holes 98 and 116, and plug weld slots 131 secure ribs 74 and half shells 77, 80, 119, and 122 together as exhaust pipe 26. A lateral circumferential weld seam 167 secures Y-pipe assembly 23 to exhaust pipe 26. Exhaust gases enter Y-pipe flat exhaust pipe assembly 20 through respective inlet portions 35 and 38 of secondary exhaust pipes 29 and 32 which are typically clamped or welded to an exhaust pipe, collector, or header (not shown) so as to receive exhaust gasses from an internal combustion engine (not shown). The exhaust gasses travel through beveled outlet portions 41 and 44 into a flattened circular cross-section inlet opening 170 of inlet 68 formed by upper and lower front half shells 77 and 80 into a main funnel passageway 173 formed thereby having a pair of individual passageways 176 and 179 interconnected by exhaust gas cross-over holes 95 and 113. Such exhaust gasses continue on into a main mixing passageway 182 formed by upper and lower rear half shells 119 and 122 having individual passageways 185 and 188 inter-connected by exhaust gas cross-over holes 149. Main funnel passageway 173 and main mixing passageway 182 allow the exhaust gasses to mix or combine and expand prior to exiting through a flattened outlet opening (not shown) of body 71. A bottom surface 191 of exhaust pipe 26 lies in a plane "AA" with upper and lower front half shells 77 and 80 angled vertically so as to provide extra ground clearance. Upper and lower front half shells 77 and 80, upper and lower rear half shells 119 and 122, and spacer ribs 74 are typically made of sheet metal such as mild steel, stainless steel, or aluminum which is punched out of a sheet of metal and formed using a break or other comparable press.

Referring to FIGS. 10–11, therein is shown a typical installation of Y-pipe flat exhaust assembly 20 to a race car Comprising a stock car 194. Stock car 194 includes a body 197 mounted on or integral with a frame or chassis 200 with a plurality of wheels 203. An eight cylinder internal combustion engine 206 powers stock car 194 through a drive train 209. Stock cars generally race on oval tracks in a counter-clockwise rotational direction leaning toward the outside of the turn, or the right side 212 of stock car 194. Therefore, the greatest clearance between chassis 200 of stock car 194 and the track or ground surface 215 results on the left side 218 of stock car 194. As such, body 71 of Y-pipe flat exhaust assembly 20 is typically mounted to the left side 218 of stock. car 194 under chassis 200. Note, however, in some situations the combination of ride height, type of track, and the design of the suspension and the stiffness thereof, Y-pipe assembly 23 and .flat exhaust pipe 26 of Y-pipe flat exhaust assembly 20 might be reversed such that exhaust pipe 26 exits from the outside, or right side 212 of stock car 194 such as for use on some road race tracks. Exhaust gasses from engine 206 exit therefrom through a pair of left and right side headers 221 and 224 comprising a plurality of left and right side primary exhaust pipes 227 and 230 which merge into respective left and right side merge collectors 233 and 236. Respective inlet portions 35 and 38 of secondary exhaust pipes 29 and 32 are clamped or welded to respective collectors 221 and 224. Body 71 of exhaust pipe 26 is attached to chassis 200 of stock car 194 such as by means of a strap 239 or other such bracketry (not shown) which extends diagonally across body 71 and attaches such as to a main member 242 of chassis 200 such as by means of a pair of bolts 245 disposed in a pair of threaded holes (not shown) therein. Y-pipe flat exhaust assembly 20 is thus supported by secondary exhaust pipes 29 and 32 connected to respective headers 221 and 224 connected to engine 206, and by means of strap 239 supporting body 71 immediately under chassis 200, and combined with a thin profile and flat bottom surface 191 provides maximum ground clearance "B" while maintaining an adequate cross-sectional area for exhaust gasses to exit through a flattened outlet opening 248 of body 71 so as to not create an unacceptable amount of exhaust gas back-pressure lowering the power output of engine 206. Body 71 of flat exhaust pipe 26 is trimmed to fit the particular stock car 194 as at edge 251 removing the remaining portion (not shown). An optional H-pipe or exhaust gas crossover pipe (not shown) can be welded, or removably connected by means of welding standard fittings (not shown), to connect a pair of holes (not shown) one in the side of each of secondary exhaust pipes 29 and 32. Such crossover pipe allows exhaust gasses to crossover between secondary exhaust pipes 29 and 32 to better balance the exhaust gas pressures therein during the firing of the cylinders of engine 206 dumping exhaust gasses from headers 221 and 224 through both respective secondary exhaust pipes 29 and 32 as to reduce exhaust gas backpressure to engine 206 by allowing more efficient exiting of such exhaust gasses.

Referring to FIGS. 12–16, therein is shown a second embodiment Y-pipe boom tube. exhaust pipe assembly of the invention, Y-pipe boom tube exhaust pipe assembly 254, comprising Y-pipe assembly 23 and a flat exhaust pipe 257. Y-pipe assembly 23 comprises curved secondary exhaust pipes 29 and 32 having respective flared inlet portions 35 and 38, and beveled outlet portions al and 44 which are welded together at respective edges 47 and 50 (FIGS. 1 and 2). Flat exhaust pipe 257 comprises a second versionexhaust gas inlet 260, body 71, and a plurality of spacer ribs 74. Body 71 comprises an upper rear half shell 119 and a lower rear half shell 122.

Inlet 260 comprises inner front shells 263 and 266 of an L-shaped cross-section, and outer front shells 269 and 272 of a U-shaped cross-section. Inner front shell 263 is a single piece of formed sheet metal comprising a generally flat upper wall portion 275 and a downwardly dependent tapered trapezoidal structural rib or rib portion 278 having a plurality of variously sized exhaust cross-over holes 281 therethrough. Inner front half shell 266 is a single piece of formed sheet metal comprising a generally flat lower wall portion 284 and an upwardly dependent tapered trapezoidal structural rib or rib portion 287 having a plurality of variously sized exhaust cross-over holes 290 therethrough. Outer front shells 269 and 272 are each a single piece of formed sheet metal comprising respective generally flat upper wall portions 293 and 296, respective generally flat lower wall portions 299 and 302, interconnected by respective curved side wall portions 305 and 308. Inner front shells 263 and 266, and outer front shells 269 and 272 are affixed together to form inlet 260 at a pair of longitudinal upper weld seams 311 and 314 and at a pair of longitudinal lower weld seams 317 and 320. Rib portions 278 and 287 diverge as shown when the outer front shells 269 and 272 are assembled together. Inlet 260 is affixed to body 71 at a lateral circumferential weld seam 323 and affixed to secondary exhaust pipes 29 and 32 of Y-pipe assembly 23 at a lateral circumferential weld seam 326.

Exhaust gases from an internal combustion engine (not shown) travel through secondary exhaust pipes 29 and 32 of Y-pipe assembly 23 into a flattened circular cross-section inlet opening 329 of inlet 260 formed by inner front shells 263 and 266, and outer front shells 269 and 272 into a main funnel passageway 332 formed thereby having a pair of individual passageways 335, 338, and 341 inter-connected by exhaust gas cross-over holes 281 and 290. Such exhaust gasses continue on into main mixing passageway 182 having individual passageways 185, 186, 187, and 188 interconnected by exhaust gas cross-over holes (not shown) allowing the exhaust gasses to mix or combine and expand prior to exiting through a flattened outlet opening (not shown) of body 71. A bottom surface 344 of exhaust pipe 257 lies in a plane "B" with inner front shells 263 and 266, and outer front shells 269 and 272 angled vertically relative to body 71 so as to provide extra ground clearance. Inner front shells 263 and 266, and outer front shells 269 and 272 are typically made of sheet metal such as mild steel, stainless steel, or aluminum which is punched out of a sheet of metal and formed using a break or other comparable press.

The Y-pipe assemblies, the tubular inlets, boom tube exhaust pipes, and exhaust systems, all comprise the inventive concept of the invention with many variations thereof possible while still staying within the overall inventive concept. Examples include, but are not limited to those disclosed in my co-pending U.S. patent application Ser. No. 09/392,398, now U.S. Pat. No. 6,283,162. Other variations of the invention include the secondary exhaust pipes each being constructed of a single piece of tubing or multiple pieces of tubing affixed together such as by welding or brazing.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A Y-pipe assembly for attachment to the respective ends of a pair of primary exhaust pipes or header assemblies which lead exhaust gasses from the engine of a motor vehicle, and to the inlet of a boom tube exhaust pipe which mounts to the bottom portion of the frame or chassis of the motor vehicle, which Y-pipe assembly and boom tube exhaust pipe provide improved ground clearance, comprising:

a first secondary exhaust pipe of a generally rounded cross-section comprising an inlet portion connectable to one of the header assemblies for receiving exhaust gasses therefrom and a longitudinally beveled outlet portion;

a second secondary exhaust pipe of a generally rounded cross-section comprising an inlet portion connectable to the other of the header assemblies for receiving exhaust gasses therefrom and a longitudinally beveled outlet portion; and wherein said beveled outlet portions of said secondary exhaust pipes are affixed together along a respective edge of each thereof so as to merge together with respective centerlines thereof at an oblique angle to a single outlet opening which is connectable to the inlet of the boom tube by affixing thereto, and wherein said secondary exhaust pipes are substantially the same length as measured along said respective longitudinal centerlines thereof.

2. A Y-pipe assembly according to claim 1, wherein one of said secondary exhaust pipes is curved to lengthen and substantially equalize the length along the longitudinal centerline thereof to that of the other secondary exhaust pipe.

3. A Y-pipe assembly for attachment to the respective ends of a pair of primary exhaust pipes or header assemblies which lead exhaust gasses from the engine of a motor vehicle, and to the inlet of a boom tube exhaust pipe which mounts to the bottom portion of the frame or chassis of the motor vehicle, which Y-pipe assembly and boom tube exhaust pipe provide improved ground clearance, comprising:

a first secondary exhaust pipe of a generally rounded cross-section comprising an inlet portion connectable to one of the header assemblies for receiving exhaust gasses therefrom and a longitudinally beveled outlet portion;

a second secondary exhaust pipe of a generally rounded cross-section comprising an inlet portion connectable to the other of the header assemblies for receiving exhaust gasses therefrom and a longitudinally beveled outlet portion; and wherein said beveled outlet portions of said secondary exhaust pipes are affixed together along a respective edge of each thereof so as to merge together with respective centerlines thereof at an oblique angle to a single outlet opening which is connectable to the inlet of the boom tube by affixing thereto, and wherein said respective secondary exhaust pipes are longitudinally tapered in the vertical direction so as to be thinner at said outlet portion than said inlet portion thereof.

4. A Y-pipe assembly according to claim 3, wherein the inlet portion of the respective secondary exhaust pipes are substantially round in cross-section.

5. A Y-pipe assembly according to claim 4, wherein the inlet portion of the respective secondary exhaust pipes are radially flared so as to closely fit to the respective header assembly.

6. A tubular inlet for a boom tube exhaust pipe of the type which includes a tubular body of generally flattened shape, the boom tube exhaust pipe being for attachment to the outlet end of a Y-pipe attached to an exhaust header assembly which leads exhaust gasses from the engine of a motor vehicle, the tubular body having a first end with an inlet opening for receiving exhaust gasses and a second end which terminates at an outlet opening for expelling the exhaust gasses into the atmosphere, the boom tube exhaust pipe which mounts to the bottom portion of the frame or chassis of the motor vehicle so as to provide improved ground clearance, the tubular inlet comprising:

a first end of mating configuration for attachment to the Y-pipe with an inlet opening of a generally rounded cross-section for receiving exhaust gasses therefrom, said tubular inlet tapering from said first end to a generally flattened second end of mating configuration for attachment by being affixed to the tubular body for channeling the exhaust gasses from the Y-pipe to the body of the boom tube exhaust pipe;

a first and a second structural rib which extend generally longitudinally through said tubular inlet and which vertically span between and are affixed to said tubular inlet juxtaposed an upper and a lower inside surface of said tubular inlet so as to provide support therebetween, said ribs being disposed in a spaced apart relationship.

7. A tubular inlet according to claim 6, wherein a plurality of holes extend through the structural ribs to allow exhaust gasses to flow therethrough.

8. A tubular inlet according to claim 6, wherein the tubular inlet and the structural ribs are made of sheet metal.

9. A tubular inlet according to claim 8, wherein the structural ribs are of generally trapezoidal shape as viewed from a respective side thereof.

10. A tubular inlet according to claim 6, wherein the inlet opening is of a some what flattened circular shape for attachment to a comparably configured secondary exhaust pipe and includes a flattened lower surface.

11. A tubular inlet according to claim 6, wherein the structural ribs diverge from the first to the second end of the tubular inlet.

12. A tubular inlet according to claim 11, wherein the tubular inlet and ribs comprise a pair of respective upper and lower half shells, each being a single piece of formed sheet metal having a pair of respective generally flat upper and lower wall portions interconnected by a curved side wall portion and a tapered rib portion dependent from one of said wall portions, said half shells which are welded together at a pair of generally longitudinally-extending seams and plug welded at a plurality of generally 7 longitudinally-extending plug weld holes through the wall portion adjacent each of said ribs.

13. A tubular inlet according to claim 12, wherein a plurality of holes extend through the structural rib to allow exhaust gasses to flow therethrough.

14. A tubular inlet according to claim 12, wherein the inlet opening is of a somewhat flattened circular shape for attachment to comparably configured secondary exhaust pipes and includes a flattened lower surface.

15. A tubular inlet for a boom tube exhaust pipe of the type which includes a tubular body of generally flattened shape, the boom tube exhaust pipe being for attachment to the outlet end of a Y-pipe attached to an exhaust header assembly which leads exhaust gasses from the engine of a motor vehicle; the tubular body having a first end with an inlet opening for receiving exhaust gasses and a second end which terminates at an outlet opening for expelling the exhaust gasses into the atmosphere, the boom tube exhaust pipe which mounts to the bottom portion of the frame or chassis of the motor vehicle so as to provide improved ground clearance, the tubular inlet comprising:

a first end of mating configuration for attachment to the Y-pipe with an inlet opening for receiving exhaust gasses therefrom, said tubular inlet tapering from said first end to a generally flattened second end of mating configuration for attachment by being affixed to the tubular body for channeling the exhaust gasses from the Y-pipe to the body of the boom tube exhaust pipe;

a first and a second structural rib which extend generally longitudinally through said tubular inlet and which vertically span between and are affixed to said tubular inlet juxtaposed an upper and a lower inside surface of said tubular inlet so as to provide support therebetween, said ribs being disposed in a spaced apart relationship diverging from said first to said second end of the tubular inlet; and wherein said tubular inlet and ribs comprise a pair of respective inner shells of generally L-shaped cross-section and a pair of respective outer shells of generally U-shaped cross-section, said inner shells each being a single piece of formed sheet metal having a generally flat wall portion of generally trapezoidal shape with one of said ribs dependent therefrom also being of generally trapezoidal shape, said outer shells each being a single piece of formed sheet metal having a pair of spaced apart, generally flat walls of generally trapezoidal shape interconnected by respective curved side wall portions, said inner shells which fit together to form a tubular middle passageway and said outer shells which fit laterally juxtaposed said inner shells to form respective lateral passageways with said inner shells, said inner and outer shells being affixed together at a pair of upper and a pair of lower generally longitudinally-extending seams.

16. A tubular inlet according to claim 15, wherein a plurality of holes extend through the structural ribs to allow exhaust gasses to flow therethrough.

17. A tubular inlet according to claim 15, wherein the inlet opening is of a somewhat flattened circular shape for attachment to comparably configured secondary exhaust pipes and includes a flattened lower surface.

18. A Y-pipe and tubular inlet assembly for attachment to the respective ends of a pair of primary exhaust pipes or header assemblies which lead exhaust gasses from the engine of a motor vehicle, and to a tubular body of a boom tube exhaust pipe of the type having a generally flattened shape, the tubular body having a first end with an inlet opening for receiving exhaust gasses and a second end which terminates at an outlet opening for expelling the exhaust gasses into the atmosphere, the tubular inlet and body which form a boom tube exhaust pipe which mounts to the bottom portion of the frame or chassis of the motor vehicle and which along with the Y-pipe provide improved ground clearance, the Y-pipe and tubular inlet assembly comprising:

a Y-pipe having a first secondary exhaust pipe comprising an inlet portion connectable to one of the header assemblies for receiving exhaust gasses therefrom and a bevelled outlet portion, and a second secondary exhaust pipe comprising an inlet portion connectable to the other of the header assemblies for receiving exhaust gasses therefrom and a bevelled outlet portion, wherein said bevelled outlet portions of said secondary exhaust pipes are affixed together along a respective edge of each thereof so as to merge together with respective centerlines thereof at an oblique angle to a single outlet opening which is connectable to the inlet of the boom tube by affixing thereto; and a tubular inlet having a first end of mating configuration and affixed to said Y-pipe with an inlet opening for receiving exhaust gasses therefrom, said tubular inlet tapering from said first end to a generally flattened second end of mating configuration for attachment by being affixed to the tubular body for channeling the exhaust gasses from the Y-pipe to the body of the boom tube exhaust pipe.

19. A Y-pipe. and tubular inlet -assembly according to claim wherein the secondary exhaust pipes of the Y-pipe are substantially the same length as measured along respective longitudinal centerlines thereof and the oblique angle of intersection of the centerlines is between about 0 and 60 degrees.

20. A Y-pipe and tubular inlet assembly according to claim 18, wherein the respective secondary exhaust pipes of the Y-pipe are longitudinally tapered in the vertical direction so as to be thinner at the outlet portion than the inlet portion thereof and the inlet opening of the tubular inlet is of a somewhat flattened circular shape for attachment to comparably configured secondary exhaust pipes and includes a flattened lower surface.

21. A Y-pipe and tubular inlet assembly according to claim 18, further comprising a structural rib which extends generally longitudinally through the tubular inlet and which vertically spans between and is affixed to said tubular inlet juxtaposed an upper and a lower inside surface of said tubular inlet so as to provide support therebetween.

22. A Y-pipe and tubular inlet assembly according to claim 18, further comprising a second structural rib, said ribs being disposed in a spaced apart relationship within the tubular inlet, wherein said structural ribs diverge from the first to the second end of said tubular inlet.

23. A Y-pipe and tubular inlet assembly according to claim 22, wherein the tubular inlet and ribs comprise a pair of respective inner shells of generally L-shaped cross-section and a pair of respective outer shells of generally U-shaped cross-section, said inner shells each being a single piece of formed sheet metal having a generally flat wall portion of generally trapezoidal shape with one of said ribs dependent therefrom also being of generally trapezoidal shape, said outer shells each being a single piece of formed sheet metal having a pair of spaced apart, generally flat walls of generally trapezoidal shape interconnected by respective curved side wall portions, said inner shells which fit together to form a tubular middle passageway and said outer shells which fit laterally juxtaposed said inner shells to form respective lateral passageways with said inner shells, said inner and outer shells being affixed together at a pair of upper and a pair of lower generally longitudinally-extending seams.

24. A Y-pipe and tubular inlet assembly according to claim 22, wherein the tubular inlet and ribs comprise a pair of respective upper and lower half shells, each being a single piece of formed sheet metal having a pair of respective generally flat upper and lower wall portions interconnected by a curved side wall portion and a tapered rib portion dependent from one of said wall portions, said half shells which are welded together at a pair of generally longitudinally-extending seams and plug welded at a plurality of generally longitudinally-extending plug weld holes through the wall portion adjacent each of said ribs.

25. A boom tube exhaust pipe for attachment to the end of secondary exhaust pipes leading exhaust gasses from the engine of a motor vehicle, which boom tube exhaust pipe mounts to the bottom portion of the frame or chassis of the motor vehicle, and which provides improved ground clearance between the exhaust pipe and the surface of the ground, comprising:

a tubular inlet having a first end of mating configuration for attachment to the secondary exhaust pipes with an inlet opening for receiving exhaust gasses therefrom, said tubular inlet tapering from said first end to a second generally flattened end;

a tubular body of generally flattened shape corresponding to said second end of said tubular inlet, said tubular body having a first end affixed to said second end of said tubular inlet with an inlet opening for receiving exhaust gasses therefrom and a second end which extends therefrom and which terminates at an outlet opening for expelling the exhaust gasses into the atmosphere; and wherein a pair of structural ribs, a first of which extends generally longitudinally through said tubular inlet and which vertically spans between and is affixed to said tubular inlet juxtaposed an upper and a lower inside surface of said tubular inlet so as to provide support therebetween, and a second of which extends generally longitudinally through said body and which vertically spans between and is affixed to said body juxtaposed an upper and a lower inside surface of said body so as to provide support therebetween.

26. A boom tube exhaust pipe for attachment to the end of secondary exhaust pipes leading exhaust gasses from the engine of a motor vehicle, which boom tube exhaust pipe mounts to the bottom portion of the frame or chassis of the motor vehicle, and which provides improved ground clearance between the exhaust pipe and the surface of the ground, comprising:

a tubular inlet having a first end of mating configuration for attachment to the secondary exhaust pipes with an inlet opening for receiving exhaust gasses therefrom, said tubular inlet tapering from said first end to a second generally flattened end;

a tubular body of generally flattened shape corresponding to said second end of said tubular inlet, said tubular body having a first end affixed to said second end of said tubular inlet with an inlet opening for receiving exhaust gasses therefrom and a second end which extends therefrom and which terminates at an outlet opening for expelling the exhaust gasses into the atmosphere; and a pair of structural ribs which extend generally longitudinally through said tubular inlet and which vertically span between and are affixed to said tubular inlet juxtaposed an upper and a lower inside surface of said tubular inlet so as to provide support therebetween, said ribs being disposed in a spaced apart relationship within said tubular inlet, wherein said structural ribs diverge from said first to said second end of said tubular inlet.

27. A boom tube exhaust pipe according to claim 26, wherein the tubular inlet and ribs comprise a pair of respective inner shells of generally L-shaped cross-section and a pair of respective outer shells of generally U-shaped cross-section, said inner shells each being a single piece of formed sheet metal having a generally flat wall portion of generally trapezoidal shape with one of said ribs. dependent therefrom also being of generally trapezoidal shape, said outer shells each being a single piece of formed sheet metal having a pair of spaced apart, generally flat walls of generally trapezoidal shape interconnected by respective curved side wall portions, said inner shells which fit together to form a tubular middle passageway and said outer shells which fit laterally juxtaposed said inner shells to form respective lateral passageways with said inner shells, said inner and outer shells being affixed together at a pair of upper and a pair of lower generally longitudinally-extending seams.

28. A boom tube exhaust pipe according to claim 26, wherein the tubular inlet and ribs comprise a pair of respective upper and lower half shells, each being a single piece of formed sheet metal having a pair of respective generally flat upper and lower wall portions interconnected by a curved side wall portion and a tapered rib portion dependent from one of said wall portions, said half shells which are welded together at a pair of generally longitudinally-extending seams and plug welded at a plurality of generally longitudinally-extending plug weld holes through the wall portion adjacent each of said ribs.

29. A Y-pipe and boom tube exhaust pipe assembly for attachment to the respective ends of a pair of primary exhaust pipes or header assemblies which lead exhaust gasses from the engine of a motor vehicle, which Y-pipe and boom tube exhaust pipe assembly mounts to the bottom portion of the frame or chassis of the motor vehicle, and which provides improved ground clearance between the exhaust pipe and the surface of the ground, comprising:

a Y-pipe having a first secondary exhaust pipe comprising an inlet portion connectable to one of the header assemblies for receiving exhaust gasses therefrom and a bevelled outlet portion, and a second secondary exhaust pipe comprising an inlet portion connectable to the other of the header assemblies for receiving exhaust gasses therefrom and a bevelled outlet portion, wherein said bevelled outlet portions of said secondary exhaust pipes are affixed together along a respective edge of each thereof so as to merge together with respective centerlines thereof at an oblique angle to a single outlet opening which is connectable to the inlet of the boom tube by affixing thereto; and a boom tube comprising a tubular inlet having a first end of mating configuration and affixed to said Y-pipe with an inlet opening for receiving exhaust gasses therefrom, said tubular inlet tapering from said first end to a generally flattened second end, and a tubular body of generally flattened shape corresponding to said second end of said tubular inlet, said tubular body having a first end affixed to said second end of said tubular inlet with an inlet opening for receiving exhaust gasses therefrom and a second end which extends therefrom and which terminates at an outlet opening for expelling the exhaust gasses into the atmosphere.

30. A Y-pipe and boom tube exhaust pipe assembly according to claim 29, wherein the secondary exhaust pipes of the Y-pipe are substantially the same length as measured along respective longitudinal centerlines thereof and the oblique angle of intersection of the centerlines is between about 0 and 60 degrees.

31. A Y-pipe and boom tube exhaust pipe assembly according to claim 29, wherein the respective secondary exhaust pipes of the Y-pipe are longitudinally tapered in the vertical direction so as to be thinner at the outlet portion than the inlet portion thereof and the inlet opening of the tubular inlet is of a somewhat flattened circular shape for attachment to comparably configured secondary exhaust pipes and includes a flattened lower surface.

32. A Y-pipe and boom tube exhaust pipe assembly according to claim 29, further comprising a pair of structural ribs, a first of which extends generally longitudinally through the tubular inlet and which vertically spans between and is affixed to said tubular inlet juxtaposed an upper and a lower inside surface of said tubular inlet so as to provide support therebetween, and a second of which extends generally longitudinally through the body and which vertically spans between and is affixed to said body juxtaposed an upper and a lower inside surface of said body so as to provide support therebetween.

33. A Y-pipe and boom tube exhaust pipe assembly according to claim 29, further comprising a pair of structural ribs which extend generally longitudinally through the tubular inlet and which vertically span between and are affixed to said tubular inlet juxtaposed an upper and a lower inside surface of said tubular inlet so as to provide support therebetween, said ribs being disposed in a spaced apart relationship. within said tubular inlet, wherein said structural ribs diverge from the first to the second end of said tubular inlet.

34. A Y-pipe and boom tube exhaust pipe assembly according to claim 33, wherein the tubular inlet and ribs comprise a pair of respective inner shells of generally L-shaped cross-section and a pair of respective outer shells of generally U-shaped cross-section, said inner shells each being a single piece of formed sheet metal having a generally flat wall portion of generally trapezoidal shape with one of said ribs dependent therefrom also being of generally trapezoidal shape, said outer shells each being a single piece of formed sheet metal having a pair of spaced apart, generally flat walls of generally trapezoidal shape interconnected by respective curved side wall portions, said inner shells which fit together to form a tubular middle passageway and said outer shells which fit laterally juxtaposed said inner shells to form respective lateral passageways with said inner shells, said inner and outer shells being affixed together at a pair of upper and a pair of lower generally longitudinally-extending seams.

35. A Y-pipe and boom tube exhaust pipe assembly according to claim 33, wherein the tubular inlet and ribs comprise a pair of respective upper and lower half shells, each being a single piece of formed sheet metal having a pair of respective generally flat upper and lower wall portions interconnected by a curved side wall portion and a tapered rib portion dependent from one of said wall portions, said half shells which are welded together at a pair of generally longitudinally-extending seams and plug welded at a plurality of generally longitudinally-extending plug weld holes through the wall portion adjacent each of said ribs.

36. An exhaust system for use on a motor vehicle powered by an internal combustion engine having multiple power cylinders at opposite sides thereof which provides improved ground clearance, comprising:

a pair of exhaust pipe header assemblies each including a plurality of primary exhaust pipes each connectable at a first end thereof to a respective power cylinder at a respective side of the engine and a merge collector into which respective opposite ends of said primary exhaust pipes are affixed;

a Y-pipe having a first secondary exhaust pipe comprising an inlet portion connectable to said merge collector of one of said header assemblies for receiving exhaust gasses therefrom and a bevelled outlet portion, and a second secondary exhaust pipe comprising an inlet portion connectable to said merge collector of the other of said header assemblies for receiving exhaust gasses therefrom and a bevelled outlet portion, wherein said bevelled outlet portions of said secondary exhaust pipes are affixed together along a respective edge of each thereof so as to merge together with respective centerlines thereof at an oblique angle to a single outlet opening which is connectable to the inlet of the boom tube by affixing thereto; and a boom tube comprising a tubular inlet having a first end of mating configuration and affixed to said Y-pipe with an inlet opening for receiving exhaust gasses therefrom, said tubular inlet tapering from said first end to a generally flattened second end, and a tubular body of generally flattened shape corresponding to said second end of said tubular inlet, said tubular body having a first end affixed to said second end of said tubular inlet with an inlet opening for receiving exhaust gasses therefrom and a second end which extends therefrom and which terminates at an outlet opening for expelling the exhaust gasses into the atmosphere.

37. An exhaust system according to claim 36, wherein the inlet portion of the respective secondary exhaust pipes are substantially round in cross-section and radially flared so as to closely fit to the respective header assembly, said secondary exhaust pipes being longitudinally tapered in the vertical direction so as to be thinner at the outlet portion than the inlet portion thereof, and the inlet opening of the tubular inlet is of a somewhat flattened circular shape for attachment to said second end portions of said secondary exhaust pipes of said Y-pipe and includes a flattened lower surface.

38. An exhaust system according to claim 37, wherein the flattened body includes a bottom surface lying generally in a plane and the inlet includes a bottom surface which lies at or above said lower plane in a mounted position on the motor vehicle.

* * * * *